United States Patent [19]

Tatsuwaki et al.

[11] 4,365,307
[45] Dec. 21, 1982

[54] TEMPERATURE PATTERN MEASURING DEVICE

[75] Inventors: Masao Tatsuwaki; Shin Nemoto, both of Osaka; Yutaka Katayama, Wakayama; Michio Okada, Wakayama; Kazuyuki Hotta, Wakayama, all of Japan

[73] Assignee: Sumitomo Kinzoku Kogyo Kabushiki Gaisha, Osaka, Japan

[21] Appl. No.: 238,357

[22] Filed: Feb. 25, 1981

[51] Int. Cl.³ .............................................. G01J 5/18
[52] U.S. Cl. ..................................... 364/557; 364/525; 358/110; 356/45; 374/124
[58] Field of Search ...................... 364/557, 525, 526; 358/100, 101, 106, 107, 110, 113; 73/355 R, 356; 356/45, 416, 418; 250/358 P, 342, 338

[56] References Cited

U.S. PATENT DOCUMENTS

| | | | |
|---|---|---|---|
| 4,121,459 | 10/1978 | MaCall et al. | 73/355 R X |
| 4,168,430 | 9/1979 | Denis et al. | 358/113 X |
| 4,222,663 | 9/1980 | Gebhart et al. | 356/45 |
| 4,254,338 | 3/1981 | Abel et al. | 364/557 X |
| 4,257,106 | 3/1981 | Auer | 364/525 |
| 4,305,096 | 12/1981 | Tokoshima et al. | 358/106 X |
| 4,326,798 | 4/1982 | Kahn | 73/355 R X |

*Primary Examiner*—Edward J. Wise
*Attorney, Agent, or Firm*—Wenderoth, Lind & Ponack

[57] ABSTRACT

A temperature pattern measuring device for obtaining the surface temperature distribution of an object. The device receives an image of the measured object and two different wavelength components of light emitted from the object. The device performs a two color temperature process for each minute area within a visual field of the image pickup, detecting the temperature at a portion on the surface of the corresponding measured object, thereby obtaining the temperature pattern thereof. The above minute areas can be set by an electrical method using photoelectric conversion means. Also, a supervision unit for the weld zone at an electrically seamed pipe, may employ the temperature pattern measuring unit of the present invention, the supervision unit producing a composite display of the form of the weld zone and the temperature pattern thereof.

11 Claims, 17 Drawing Figures

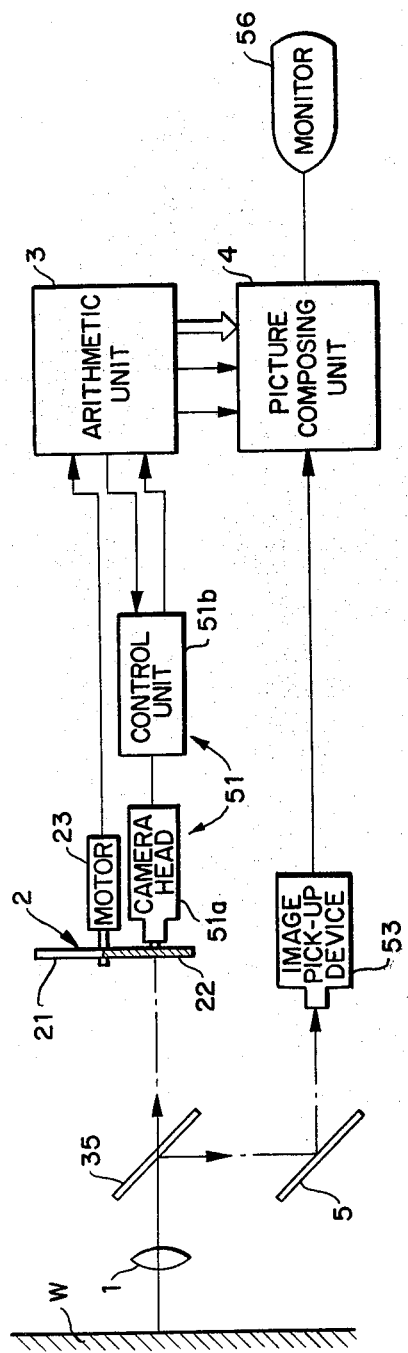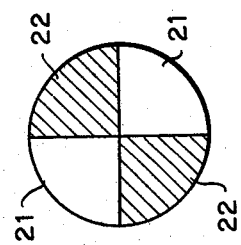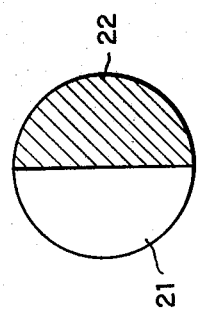

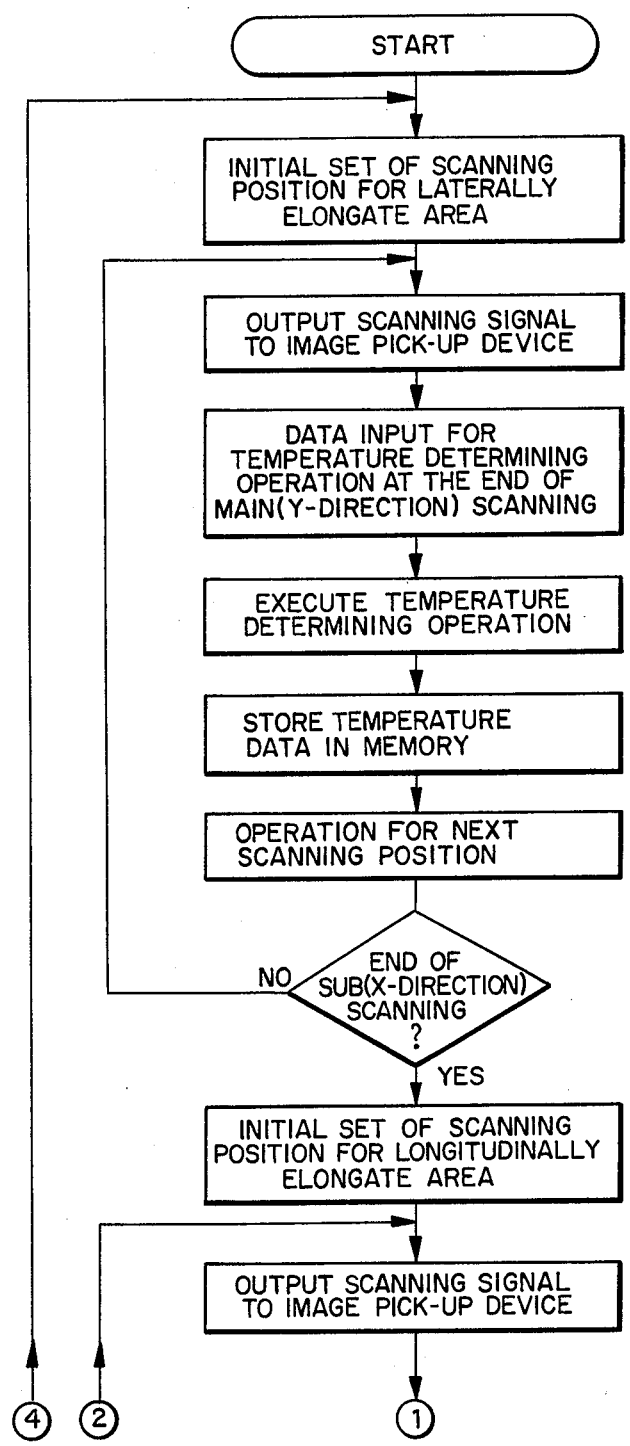

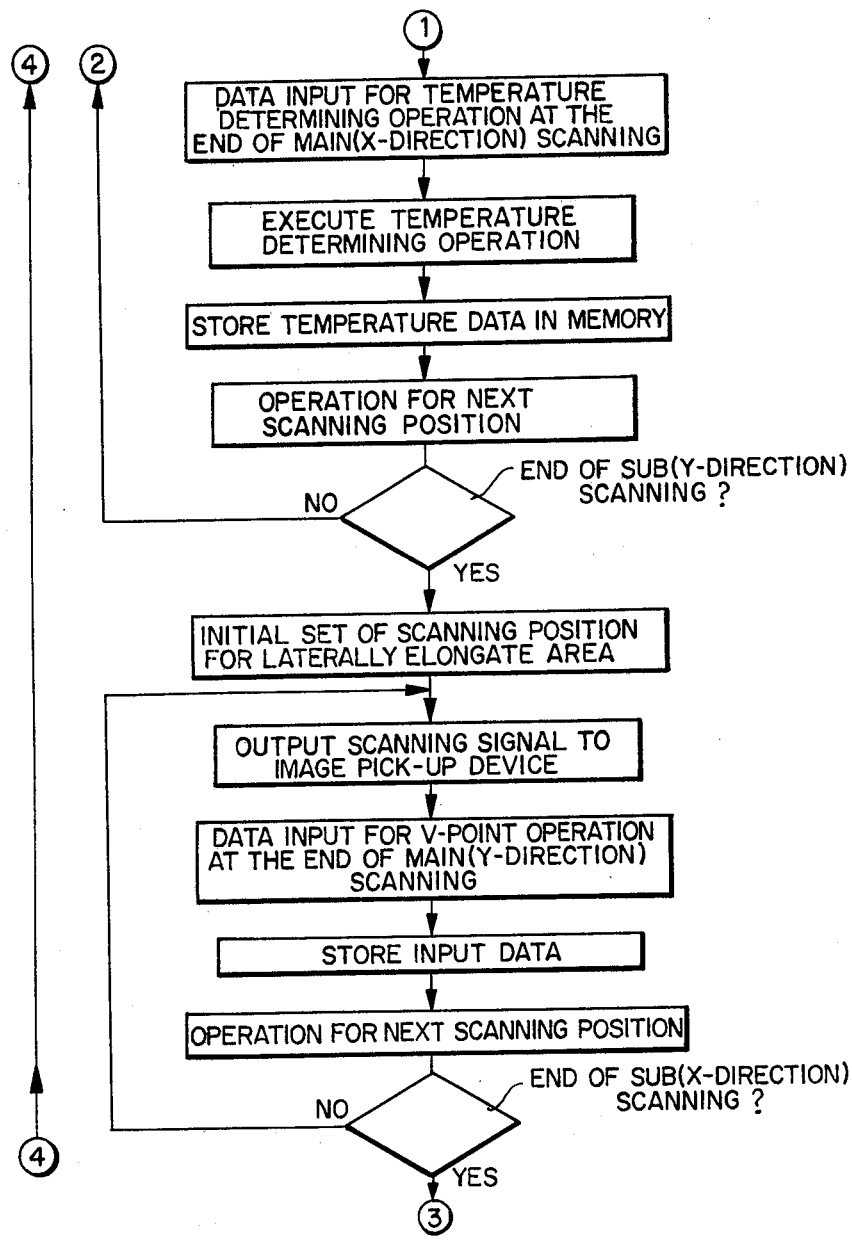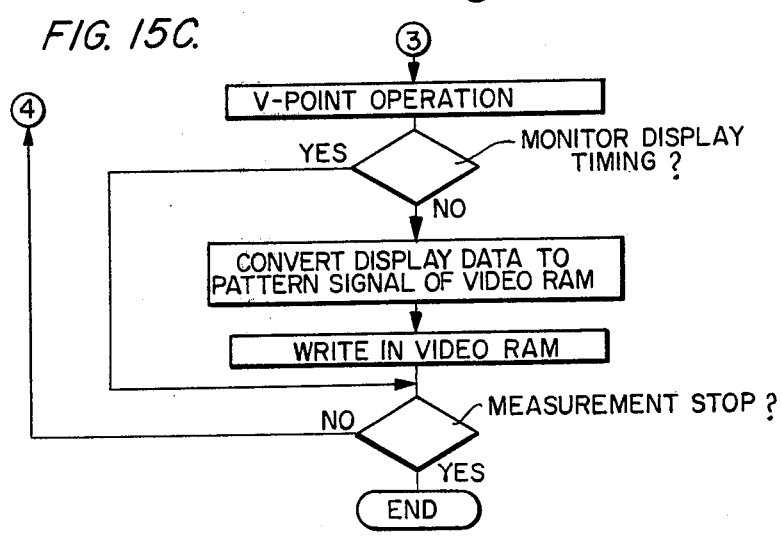

TEMPERATURE PATTERN MEASURING DEVICE

BACKGROUND OF THE INVENTION (1) Field of the Invention

This invention relates to a temperature pattern measurement device for obtaining a surface temperature distribution of an object.

(2) Description of the Prior Art

Generally, the prior art temperature pattern measuring method has widely employed an infrared ray system which two-dimensionally receives, by means of an infrared ray detection element, the optical energy from infrared rays emitted from an object comprising the target to be measured, and which scans the two-dimensional picture so that a temperature pattern on the surface of the object corresponding to the picture may be dispalyed, for example, graphically by means of a cathode-ray tube (CRT). The prior art measuring method using the infrared ray system, however, is inadequate for an object which changes its temperature because two or more seconds are required for scanning one picture. The received infrared rays which contain the temperature information are apt to be affected by the atmosphere surrounding the light propagation path so as to lower the system sensitivity and accuracy due to the presence of vapor or dust. It is also actually impossible to avoid the influence of the surrounding atmosphere by the use of an image guide, because the light intensity attenuation is greater inside the infrared ray zone within the image guide. Furthermore, since the actual minimum visual field for measurement is greater than a 10 to 20 centimeter-angle, the temperature pattern in a minimum area cannot be measured. Hence, the prior art infrared ray system measurement cannot be applied to the measurement of the temperature pattern of an object, such as metal slab, during the continuous casting process at a steel mill, or an electrically seamed steel pipe being welded, or an object surrounded by a bad atmosphere rich in vapor or dust and having rapid temperature changes. More particularly, it is quite impossible for the prior art systems to measure the temperature pattern at a minimum area, such as at the hot portion of the edge of an electrically seamed steel pipe.

On the other hand, a two-color thermometer, which is applied as the fundamental technique of the present invention, receives two predetermined wavelength components in the visible region which are emitted from an object, thereby measuring the object surface temperature by non-contact techniques. The two color thermometer can measure a typical temperature within the visual field but not the temperature pattern. Under these circumstances, iron manufacturing and steel manufacturing processes often need to measure the temperature pattern, but the above-noted temperature pattern measuring methods cannot easily meet such a requirement.

SUMMARY OF THE INVENTION

An object of the invention is to provide a temperature pattern measuring device which utilizes a two-color thermometer technique and a picture information process which is not seriously affected by the surrounding atmosphere and which is capable of performing a temperature pattern measurement with a high degree of accuracy and a high resolving power.

Another object of the invention is to provide a temperature pattern measuring device which is capable of utilizing an image guide and thereby capable of measuring the temperature pattern at a minimum area or deep inner area which is not visible from the exterior of the object being measured.

A further object of the invention is to provide a supervisory device for a weld zone of an electrically seamed pipe, which uses the temperature pattern measuring device of the present invention.

The above and further objects and novel features of the invention will more fully be apparent from the following detailed description when the same is read in connection with the accompanying drawings.

BRIEF DESCRIPTION OF THE DRAWINGS

FIG. 12 shows a schematic diagram of another embodiment of the device in accordance with the present invention.

FIG. 13 and FIG. 14 show the patterns of rotary filters,

FIGS. 15(A), (B) and (C) show a flow chart of microcomputer.

DETAILED DESCRIPTION OF THE INVENTION

The principle of measuring by a device in accordance with the present invention is characterized in that light emitted from an object comprising the measuring target is received by first and second image pickup units via first and second optical filters of different penetrating wavelength components and compared with the picture information received by the first and second image pickup units and applied to two-color temperature processing for every area, so that the temperature at each portion of the measured object corresponding to each area is determined so as to obtain the temperature pattern thereof.

Figure 1:
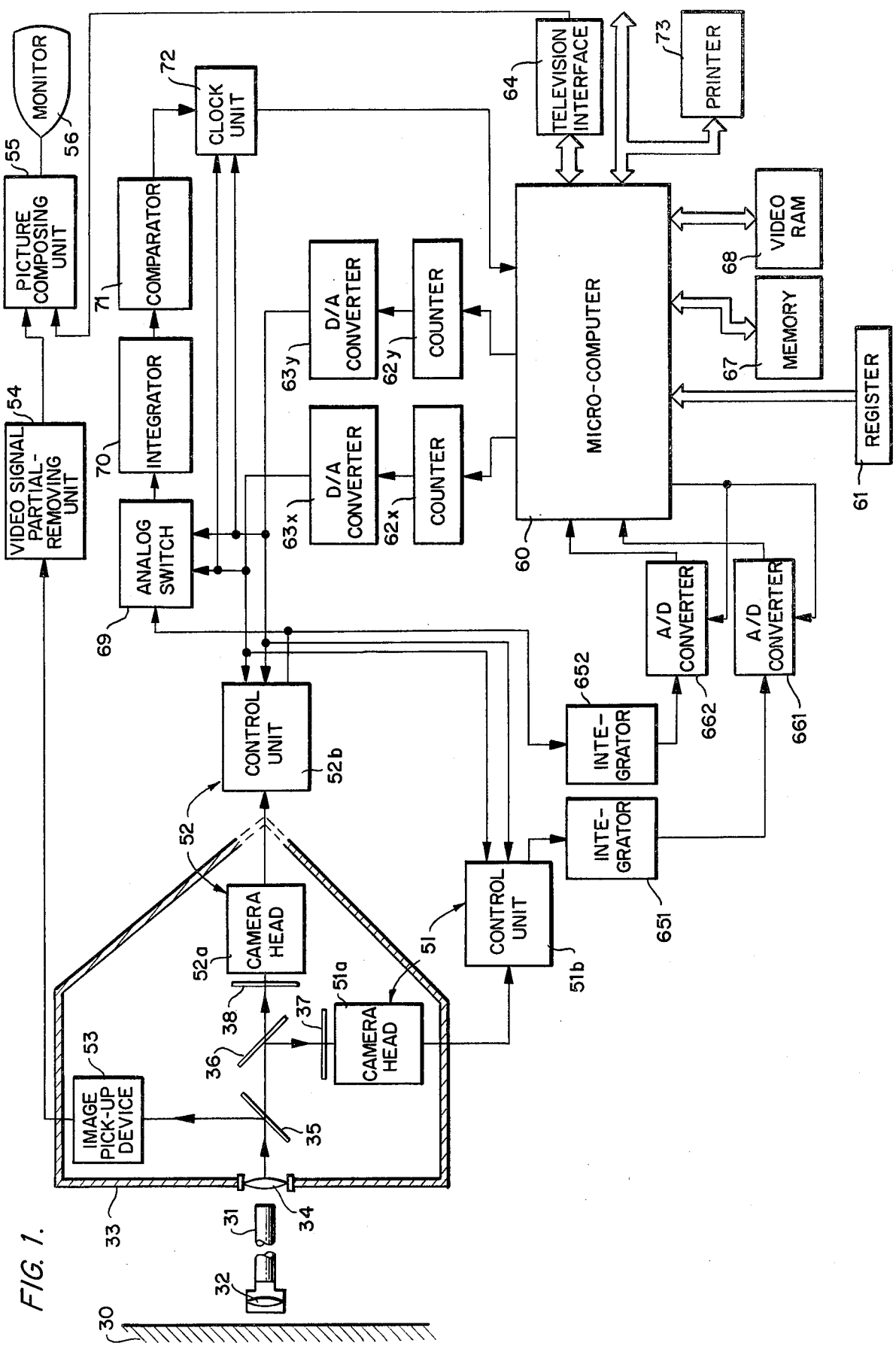
FIG. 1 is a schematic diagram of the general construction of the device in accordance with the present invention.

FIG. 1 is a block diagram of the optical and electrical systems of the device, in which reference numeral 30 designates an electrically seamed pipe in a welding process which is the object to be measured so as to obtain its temperature pattern. The pipe 30 is facing an objective 32 which is attached to the utmost end of an image guide 31. Image guide 31 comprises a number of optical fibers, each of about 25 μm in diameter, converged to about 5×6 mm in thickness, which gains at the base end thereof a constant visual field under optical conditions of objective 32 and object 30. The image guide 31 extends toward the location where a case 33 is disposed so as to avoid a dusty and hot atmosphere, and is fixed by a means (not shown) so that the optical axis of guide 31 corresponding to the horizontal optical axis of an image pickup lens 34, the case 33 being enclosed so as to be a dark box and the enclosure accommodating camera heads 51a, 52a of first and second two-dimensional image pickup devices 51, 52 and a third two-dimensional image pickup device 53, which are optically arranged in position. On the optical axis of image pickup lens 34 are disposed a 10% N.D. (neutral density) filter 35, a dichromic mirror 36, and a camera head 52a of the second two-dimensional image pickup device 52. The N.D. filter 35 reflects 10% of the incident light, regardless of its wavelength, and allows the remainder of the incident light to penetrate. The filter 35 is slanted at an angle of 45° so that the light is reflected vertically upward so as to be picked up by the third two-dimensional image pickup device 53. The dichromic mirror 36 permits penetration of light of a wavelength $\lambda_3$, e.g., 650 ηm, or more and reflects light of a wavelength under $\lambda_3$. Mirror 36 is slanted at an angle of 45° with respect to image pickup lens 34 so that the light is reflected vertically downward so as to be picked up by camera head 51a of the first two-dimensional image pickup device 51. The third image pickup device 53 is a usual color or black-and-white television camera without its image pickup lens, the image pickup lens 34 serving as the image pickup lens thereof. The image pickup device 53 is provided to observe the shape of object 30 and outputs video signals to a video signal partial-removing unit 54.

The first and second two-dimensional image pickup devices 51, 52 each employ an image dissector as a photoelectric conversion element which is capable of random-access scanning, and respectively comprise camera heads 51a, 52a and control units 51b, 52b. The image pickup lenses of camera heads 51a, 52a are removed therefrom, so that image pickup lens 34, as in the case of the image pickup device 53, functions as the image pickup lens for camera heads 51a, 42a respectively. For example, random access cameras, Model Number C1186 which are made by Hamamatsu Television, are used for image pickup devices 51, 52.

Figure 2:
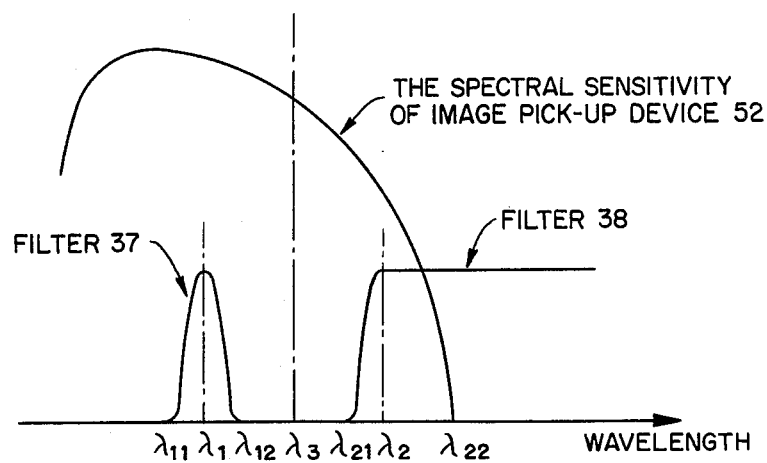
FIG. 2 is a graph showing the relationship between the magnitudes of the waveforms penetrating an optical filter.
Figure 3:
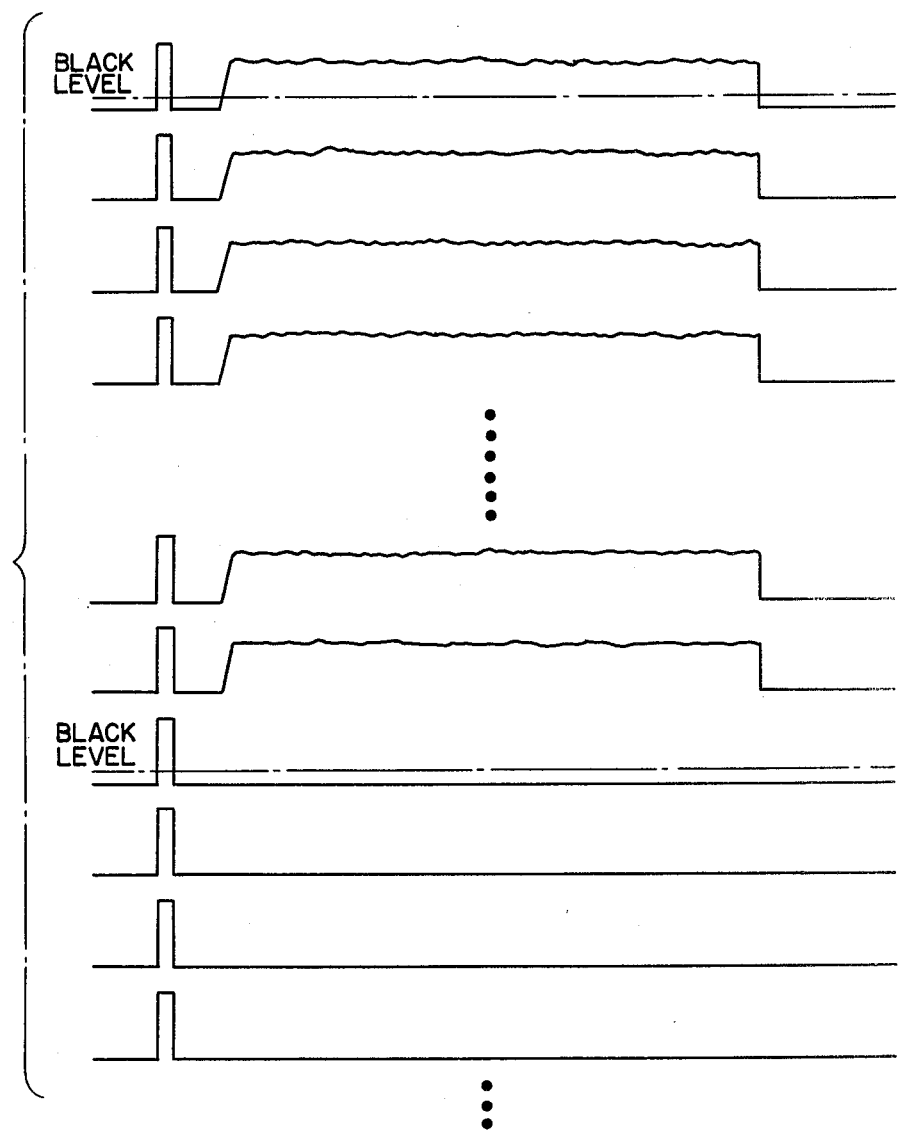
FIG. 3 is a view exemplary of the output waveforms and used to illustrate the operation of a video signal partial-removing circuit.
Figure 4:
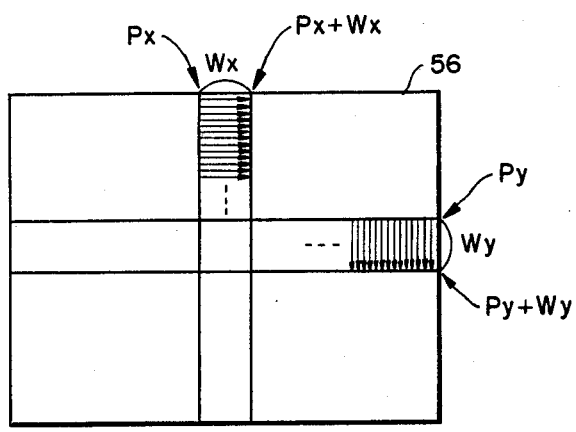
FIG. 4 is a view exemplary of a raster showing a scanning area of an image pickup device.

As seen from the above, image pickup lens 34, which is used as the image pickup lens for three image pickup devices 51, 52 and 53 in common, is positioned so as to be equal in distance from the lens 34 to the photoelectric conversion element of each image pickup device. Transparent glass is used at the portion where the image pickup lens of image pickup device 53 has been removed, and first and second optical filters 37, 38 are mounted at the position where the image pickup lenses of camera heads 51a, 52a have been removed, utilizing screws for mounting the image pickup lenses respectively. The first optical filter 37 is of a band-pass type having a main penetrating wavelength component $\lambda_1$, (where $\lambda_1 < \lambda_3$, and where the penetrating wavelength component is selected in range of $\lambda_{11}$ to $\lambda_{12}$, e.g., 550 to 600 nm). The second optical filter 38 is a high-pass filter having a lower limit value of $\lambda_{21}$ (e.g. 700 nm), where $\lambda_{21}$ is larger than $\lambda_3$, thereby substantially forming a band-pass filter between $\lambda_{21}$ and $\lambda_{22}$, wherein wavelength $\lambda_{22}$ (e.g., 850 nm) is the upper limit value of the sensitive wavelength being limited by the spectral sensitivity of image pickup device 52. The main component of the penetrating wavelength between $\lambda_{21}$ and $\lambda_{22}$ is $\lambda_2$. FIG. 2 is a graph of the relative relationship of wavelengths $\lambda_1$, $\lambda_2$ and $\lambda_3$. In brief, image pickup devices 51 and 52 receive light of respective passbands centered at $\lambda_1$ and $\lambda_2$ and image pickup device 53 receives light throughout the visible region.

Video signal partial-removing unit 54 functions to display, by means of a monitor 56, the left upper area of the image pickup visual field scanned by image pickup 53 except for band-shaped areas of a right-hand portion thereof and a lower portion thereof. Video signals having positive modulation, as shown in FIG. 13, are made black at the rear portion corresponding to about ¼ of the video signal for 1 H corresponding to one line, and black at a predetermined number of lines corresponding to the lower portion of about ¼ of one frame. Such circuits are well-known to those skilled in the art and accordingly, the description thereof has been omitted. The unit 54 comprises; means for receiving vertical and horizontal synchronizing pulses from video signals provided by image pickup device 53, pulse generating means for setting the horizontal position; a preset counter which is reset by vertical synchronizing pulses, and which counts the number of horizontal synchronizing pulses, and which generates a signal when the count corresponds to the preset value; another preset counter which is reset by horizontal synchronizing pulses and which counts the clock pulses so as to generate a signal when the count corresponds to the preset value; and a gate circuit to inhibit the output video signal to be transmitted to monitor 56 until the two preset counters are reset after respectively generating the above-noted signals. In addition, the output of the gate circuit is transmitted to monitor 56 through picture composing unit 55 so as to display a composite signal having other signals (to be hereinafter described) which are fed into picture composing unit 55.

Reference numeral 60 designates a micro-computer, for example, using a Z-80 A microprocessor unit which is made by Zilog Co., for the central processing unit (CPU); the micro-computer 60 performs scanning control and two-color temperature determining operation of the signal of image pickup devices 51,52.

The scanning control of image pickup device 51, 52 will first be detailed. Reference numeral 61 designates a register comprising a number of digital switches, such as thumb wheel switches, the register 61 indicating an area to be scanned so as to obtain the temperature pattern. FIG. 14 shows the scanning areas of image pickup devices 51, 52, in other words, the areas scanned so to obtain the temperature pattern. The areas can adopt one or both of either a laterally elongate area having a main scanning direction of Y (vertical) and a sub-scanning direction of X (horizontal) or a longitudinally elongate area having a main scanning direction of X and a sub-scanning direction of Y, so that when both the areas are scanned, the micro-computer is programmed so as to alternately scan each area. In this embodiment, register 61 can set the main scan starting positions Pr, Px of each area and the widths Wy, Wx thereof; the number of scanning lines thereof is made constant, for example—128, in any direction. Micro-computer 60 controls the system so as to carry out the scanning as shown, on a basis of the stored values of Py, Px, Wy and Wx. Between the micro-computer 60 and the X-direction deflection input terminals of control units 51b, 52b are interposed a counter 62X and a D/A converter 63X for the digital/analog conversion of the counted values of counter 62X so that the analog output of converter 63X is utilized for the X-direction deflection signals for both control units 51b and 52b. Between the micro-computer 60 and Y-direction deflection input terminals of control units 51b, 52b are interposed a counter 62Y and a D/A converter 63Y for converting the counted values of counter 62Y, so that the analog output of converter 63Y is utilized for the Y-direction deflection signals for both control units 51b and 52b, where the X (or Y) direction deflection signal of device 51 has a reversed polarity from that of image pickup device 52 because image pickup device 51 receives a mirror image in comparison with device 52.

Now, operation and control of micro-computer 60 as to the laterally elongate scanning area will be detailed. Micro-computer 60 sets data corresponding to a value of Py in counter 62Y and sets data corresponding to the first position in the sub-scanning direction in counter 62X. Micro-computer 60 provides high frequency clock pulses to counter 62Y so as to cause counter 62Y to count up. Upon counting up to a value corresponding to the value of Py+Wy, counter 62Y is reset to a value corresponding to Py, at which time counter 62X receives a clock pulse to advance its count by one step. Such a process is repeated 128 times to cause the scanning of the laterally elongate band-like area of Py to Py+Wy of image pickup devices 51 and 52. Micro-computer 60 provides a signal to television interface 64 so as to display vertical and horizontal lines at the positions of Py, Py+Wy and Px, Px+Wx respectively, such that the output of television interface 64 is transmitted to picture composing unit 55, thereby causing monitor 56 to display the portion of an object's image corresponding to the temperature measuring area. In this embodiment, video signal partial removing unit 54, picture composing unit 55 and television interface 64 are made discretely, however, special effect mixing amplifier MEA-5100 or MEA-7500 produced by Ikgeami Communication Co., or color special effect device SEG-120 produced by Sony Corp. can be used for the three circuits.

Video signal output terminals of control units 51b and 52b output photo-electric conversion signals from the portion scanned, as described above, corresponding to the scanning operation. The outputs of units 51b and 52b are input to integrators 651,652 respectively. The integrated values thereof are converted into digital data by A/D converters 661,662 and then read-in by micro-computer 60. The read-in timing of micro-computer 60 is made approximately synchronous with the time of completion of the main scanning. Hence, micro-computer 60 sequentially reads-in signals corresponding to the energy of the light of main wavelength components of $\lambda_1$, $\lambda_2$ contained within the light emitted from the same portion, and in an approximately synchronous fashion, and in the same area within the visual field obtained by both image pickup devices 51 and 52. Thus, micro-computer 60 read-in one datum per one scanning line, and thus, 128 pieces of data are read-in per one laterally or longitudinally elongate scanning area.

On the other hand, prior to the use of this device, image pickup lens 34 is covered by a shutter (not shown), so as to obtain an offset value for each of the image pickup devices 51 and 52, the value being stored in a predetermined area of memory 67, such data corresponding to the respective laterally and longitudially elongate areas of image pickup devices 51 and 52.

The program of micro-computer 60 is constructed such that every time it read-in data from A/D converters 661, 662, it deducts the offset value of the corresponding scanning position from the read-in data to determine the radiant energy corresponding to each wavelength $\lambda_1$ or $\lambda_2$ at the scanning position being measured, and executes the two-color temperature determining operation according to the following equation (3):

$$T(X,Y) = E(\epsilon_1(X, Y)/\epsilon_2(X, Y)) + \beta \quad \ldots (3)$$

wheren T(X,Y) [°K.]: a typical temperature at the position corresponding to a scanning line; $\epsilon_1(X,Y), \epsilon_2(X,Y)$: radiant energy corresponding to each of wavelength $\lambda_2$, $\lambda_2$ with the offset values noted above; and $\alpha, \beta$: constants chosen for $\lambda_1$, $\lambda_2$. In addition, equation (3) holds because the relationship between the energy ratio $\epsilon_1(x,Y)/\epsilon_2(X,Y)$ and the temperature T(X,Y) is approximately linear.

The thus obtained temperature data is stored within a predetermined area in memory 67 corresponding a plurality of frames including those frames being scanned, and the data is fed into micro-computer 60 as to be available for a predetermined purpose, and thereby capable being transmitted to various external instruments. A typical use of the data is to provide a print-out of the temperature values by means of a printer or the graphic display of a temperature pattern (i.e.—the temperature distribution at 128 horizontal or vertical points of the visual field of the image pickup device). Also, when used for the supervision of weld zones, the temperature is available for use as heating control information.

Figure 11:
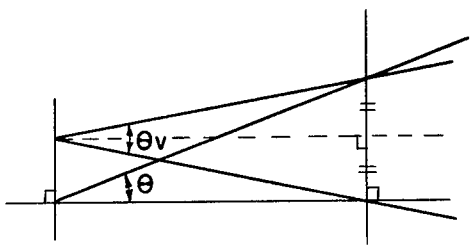
FIG. 11 is a view explanatory of the principle of computing a V angle.

The embodiment of FIG. 11 is adapted to display, on monitor 56, the horizontal or vertical temperature pattern by the use of the generated temperature pattern gained, as described above.

Figure 5:
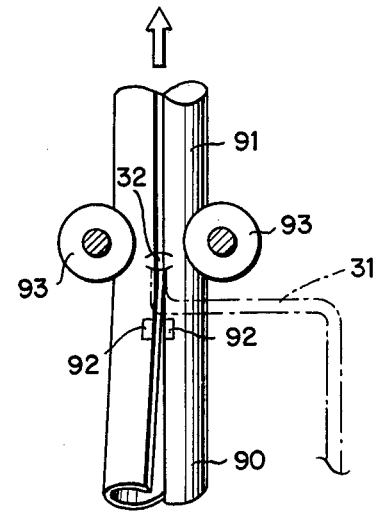
FIG. 5 is a plan view exemplary of the arrangement of objectives on the electrically seamed pipe manufacturing line.
Figure 6:
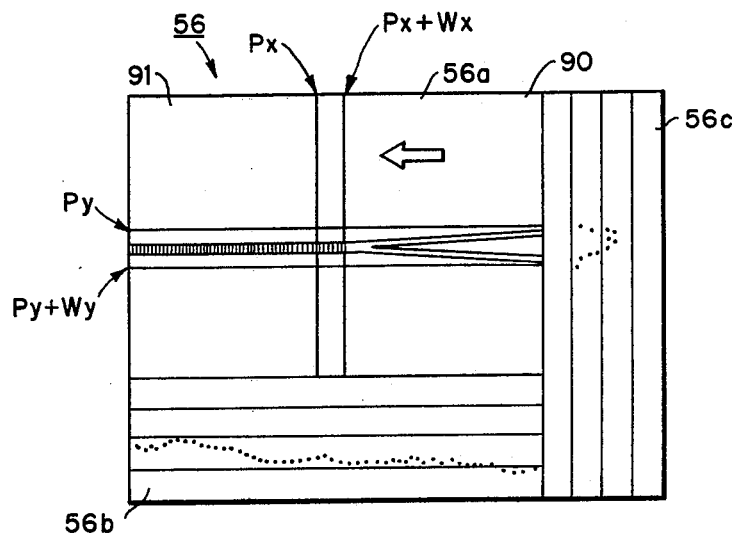
FIG. 6 is a schematic view of a display pattern on a monitor.

FIG. 5 is a plan view exemplary of the arrangement of image guide 31 and objective 32 when an electrically seamed pipe being manufactured is selected as the object 30. An open pipe 90 of a copper sheet being bent into a tubular shape is biased at both edges by contact tips 92 disposed at the upstream side of squeeze rolls 93, and welded into pressed contact by squeeze rolls 93 so as to be formed into the electrically seamed pipe, and then conveyed to a seam-annealer. The objective 32 is so disposed that an area including the weld abutment, the so-called V point, positioned slightly at the upstream side rather than the phantom line connecting the axes of squeeze rolls 93 is used as the image pickup visual field. FIG. 6 shows the display form on monitor 56 when the above-noted image pickup visual field is selected; the left upper area displays the image pickup picture received by image pickup device 53, and in which the open pipe 90, the electrically seamed pipe 91, the weld seam zones and the V point, appear. Also, two horizontal and vertical lines indicating the aforesaid scanning area appear respectively. Such portions, except for picture display area 56a, are uniformly black-levelled by a video signal partial-removing circuit 54, and are used for displaying the temperature pattern. Firstly, the area 56b located below the picture display area 56a is a laterally elongate scanning area of Py to Py+My, and in this instance, is the horizontal distribution display area used to display the lengthwise temperature distribution of the pipe along the welding seam. The area 56c at the right side of areas 56a and 56b, is a vertical distribution display area used to display the circumferential temperature distribution of the pipe along the longitudinally elongate scanning area of Px to Px+Wx. A video random access memory (VIDEO RAM) 68, having storage locations corresponding to scanning areas 56b and 56c is provided, and into which are written-in temperature scales corresponding to horizontal and vertical ruled lines to be displayed within horizontal distribution display area 56b and vertical distribution display area 56c, and having data stored therein to be used to display temperature values corresponding to the temperature scales. Data to be stored in video RAM 68, as is well-known, may be displayed by means of a white dot raster pattern. The address location of video RAM 68 corresponding to the position within areas 56b and 56c to be displayed by the white dots, is computed from temperature data obtained from the predetermined temperature scales with respect to the signal data and each scanning line, so that white dot data is written into the location of RAM 68 corresponding to said address. To write such display data in video RAM 68, a time period, such as that corresponding to the signal generating the timing of the vertical synchronizing pulse of the video signal input to monitor 56 from picture composing unit 55, and not relevant to said display, is selected. The display signals transmitted to monitor 56 relate to vertical and horizontal synchronizing pulses of the video signal so that the read-out address of video RAM 68 is read out in correspondance with the read-out address, the read-out data being input to picture composing unit 55 via television interface 64, whereby a composite pattern, such as that shown in FIG. 6, is displayed on monitor 56. Such a display makes it possible to observe the welding operation and its corresponding temperature distribution in every direction. In addition, the arrows in FIGS. 5 and 6 show the direction of forward movement of the pipe. In the case where the temperature distribution is carried out as noted above, data stored within video RAM 68 is written not every time the temperature data is renewed, but once per several data renewals, so as to avoid flickering and thereby improve viewing. When in use with the aforesaid device, the two color temperature operation measures the temperature, whereby the measurement is less affected by the surrounding atmosphere in comparison with the prior art infrared ray system and is high in accuracy. When used with the image guide as in the embodiment of FIG. 11, it is possible to measure the temperature pattern without being affected by the atmosphere, or to measure the pattern at a minute area or deep bottom which is not visible directly from the exterior thereof. Furthermore, the resolving power can be raised until restricted by the resolution of image pickup devices 51 and 52. Also, the device in this embodiment uses the image pickup device providing an image dissector to enable random access scanning, thereby readily obtaining the temperature pattern with respect to an optimum area. In other words, when a vidicon camera is used, sequential scanning is performed, so that complex software is required for obtaining temperature patterns other than those vertical or horizontal to the image pickup picture, thereby causing difficulty in practical use. The device in accordance with the invention, however, facilitates the obtaining of a temperature pattern in a desired direction and no scanning is performed on a portion not pertinent to its operation. Furthermore, an image pickup tube having no accumulation effect is used so as to be free from the influence of residual images, and is suitable for the measurement of an object which rapidly changes its temperature. Furthermore, the image pickup tube is wider in its dynamic range than that of a vidicon camera to thereby have an advantage of measuring a wider range of temperature measurement.

FIG. 12 shows another embodiment of a measuring device in accordance with this invention, which makes it possible to eliminate one of the image pickup devices 51 or 52. Lens 1, N.D. filter 35 and mirror 5 are arranged such that the device 51 picks up the light passed through the lens 1 and N.D. filter 35, and the device 53 picks up the light passed the lens 1 and reflected by the mirror 5. A rotary filter 2 is located between N.D. filter 35 and the pickup device 51. As shown in FIG. 13 or FIG. 14, the rotary filter 2 is discal and separated into two or four areas, respectively. Each area consists of optical filter 21 or 22, whose representative penetrating wavelength is $\lambda_1$ or $\lambda_2$, and filters 21 and 22 are alternately arranged. The rotary filter 2 is driven so as to rotate at a high speed by motor 23. Pickup device 51 receives the light passed through filter 21 or 22, and its output is input to an arithmetic unit 3. A pulse generator (not illustrated) is mechanically attached to either the motor 23 or rotary filter 2, and the arithmetic unit 3 discriminates between the two kinds of data (one is via filter 21 and the other is via filter 22) according to said output of the pulse generator, and executes two-color temperature operation in a fashion corresponding to that of the elements of FIG. 11. Reference numeral 4 designates a picture composing unit and 56 designates a monitor.

When the device is used for the supervision of the weld zone of an electrically seamed pipe, it is very convenient for the control of the production line to obtain the V point and also the V angle (an angle formed by both edges of open pipe 90 at the vertex of V-point), which is possible by using a device in accordance with the present invention. In other words, the video signal output of the second image pickup device 52 (or the first image pickup device 51) is utilized as follows:

The video signal is input to an analog switch 69 (See FIG. 1) which allows the video signal to pass therethrough only while the deflection signals in the X and Y directions which are output from D/A converters 63X and 63Y correspond to the scanning of the laterally elongate areas of Py to Py+Wy, whose main scanning direction is Y and whose sub-scanning direction is X. The output of analog switch 69 is input to integrator 70 whose output feeds comparator 21 for setting the threshold value at a given level. The image pickup picture generated by image pickup device 52, from a temperature distribution of the object within the visual field thereof, is in a bright red hot condition at opposite edges of the open pipe 90 and the seamed portion of the electrically seamed pipe, and becomes dark due to low temperatures away from the red hot portions, and becomes the darkest when the bottom of a gap between the opposite edges of open pipe is received.

Figure 7:
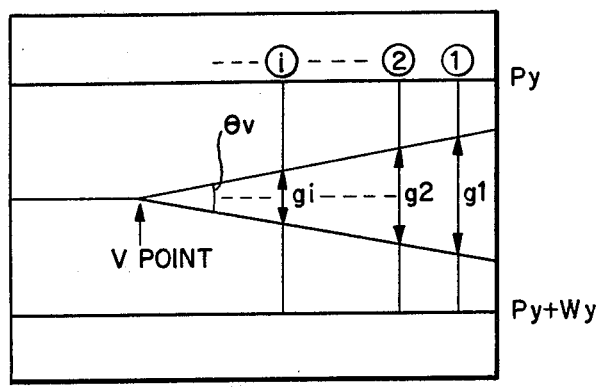
FIG. 7 is an enlarged view exemplary of the relationship between received pictures and scanning lines.
Figure 8:
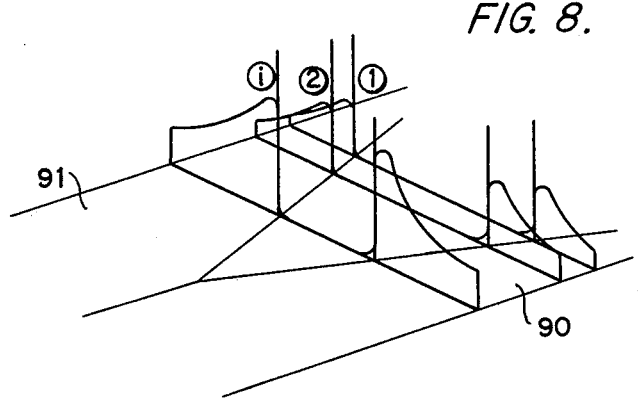
FIG. 8 is a view exemplary of the level of the video signal corresponding to the scanning line and relating to the position of the electrically seamed pipe.
Figure 9:
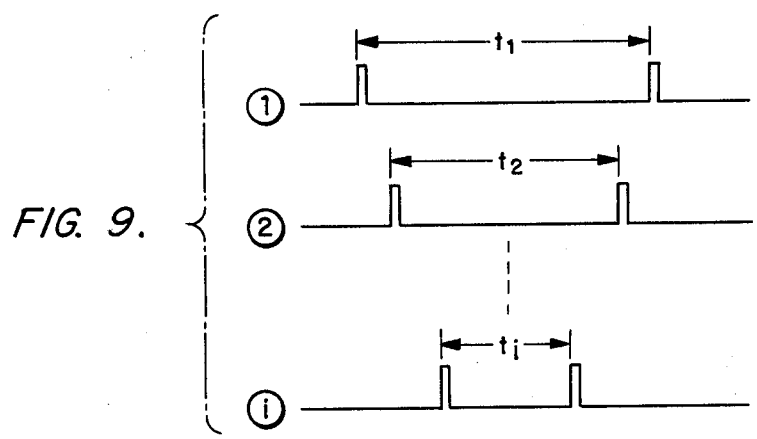
FIG. 9 shows the waveforms of signals output from the comparator 71.

FIG. 7 is an enlarged view exemplary of a pickup picture and scanning lines between Py and Py+Wy. FIG. 8 shows video signal levels corresponding to the scanning lines, and which relate to the position of electrically seamed pipe 91. Since brightness at this portion is in the aforesaid distribution, the video signal has waveforms as shown in FIG. 9, which has peaks at opposite edges of the open pipe 90 and the seamed portion of the electrically seamed pipe 91, i.e., the red hot portions. Hence, integrator 70 which receives the video signal, generates an output signal showing a steep change at the portion corresponding to opposite edges in contrast to the part of video signal which scans the open pipe 90. The output signal of integrator 70 is input to comparator 71, setting the threshold value at a given level. The comparator 71 provides pulses when the scanning spot passes through the opposite edges. If scanning lines, as shown in FIGS. 7 and 8, are designated by numbers 1, 2 ... i from the upstream side of open pipe 90, the output signal of comparator 71, as shown in FIG. 9, changes to sequentially reduced pulse intervals $t_1, t_2, \ldots t_i$. Also, the output signal of comparator 71 is input to a clock unit 72 comprising a clock oscillator and counter, and in which pulse intervals $t_1, t_2, \ldots t_i$ corresponding to the respective scanning lines are measured, the clock unit 72 being provided with deflection signals in the X and Y directions for discriminating each scanning line.

Figure 10:
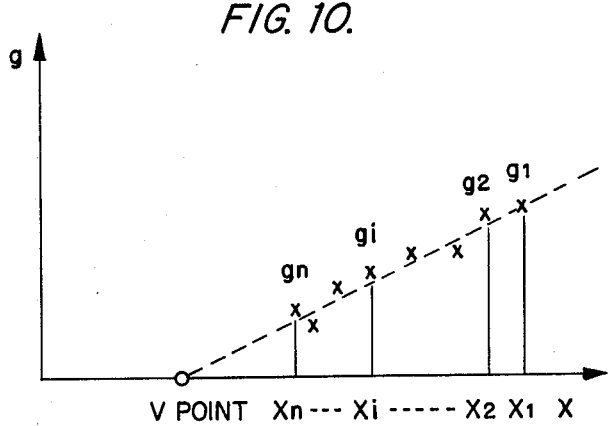
FIG. 10 is a graph showing the relationship of the positions in the abscissa X with dimensions between the opposite edges.

The micro-computer 60 sequentially reads-on the output of the counter of clock unit 72, i.e., $t_1, t_2 \ldots t_i$, which correspond to dimensions $g_1, g_2, \ldots g_i$ of intervals between opposite edges of the open pipe 90 as shown in FIG. 8. Since the order of each read-out data, i.e., the scanning line numbers 1, 2, ... i, each correspond essentially to the position in the axial (or travelling) direction, micro-computer 60 can determine the length of the interval between opposite edges at each position in the X direction. FIG. 10 schematically shows the relationship between both the measured data, in which the abscissa represents the position in X direction and the ordinate represents the dimension g between both edges. In addition, $X_1, X_2 \ldots X_i$ are values showing corresponding positions of scanning lines 1, 2, ... i, in which, for example, the left end of the visual field is made equal to 0.

Now, in this embodiment, the position in the X direction, when g=0 as to the specified V point, is not read-in from clock unit 72, but by the following method. Data after the value g becomes smaller than the prescribed value, is neglected, and $(X_i, g_i)_{i=1,2\ldots n}$ (where $n \geq 3$) is made the target of the operation process. From the above, a straight line is obtained by the least squares approximation method, so that the position in the X direction, where the straight line becomes g=0 (intersecting the abscissa X in FIG. 10) is made to be the V point.

FIG. 11 is a view explanatory of the computing principle of the V angle. If an angle between the line obtained as noted above and the abscissa X in FIG. 10, is represented by $\theta$, between the V angle $\theta_V$ (an angle formed in the vicinity of the V point by opposite edges of open pipe 390 as shown in FIG. 7) to be obtained, the following relationship holds:

$$\tan\theta = 2\tan(\theta_V/2)$$

Micro-computer 60 then computes a value of $\theta_V$ from the following equation using the above-noted relationship, $$\theta_V = 2\tan^{-1}(\tan\theta/2) \qquad \ldots (2)$$

where $\theta$ is obtained by a well-known method on a basis of the previously obtained straight line.

The V point position and V angle $\theta_V$ are output to a printer 73 for display and recording, and, when used for a heating control, to the control unit thereof. FIGS. 15(A), (B) and (C) show a flow chart for measurement. At first the temperature of laterally elongate area is measured, secondary, the temperature of longitudinally elongate area is measured and subsequentry V point and $\theta_V$ are specified.

As can be seen from the foregoing description, the method and device of this invention obtain the temperature pattern of an object by using a two color temperature determining operation using energy emitted from the object in respective bands with center wavelengths of $\lambda_1$ and $\lambda_2$, which energy is not easily affected by the atmosphere, as compared with a thermometer using infrared rays. The present invention makes possible the use of an image guide which cannot be used with infrared rays due to transmission loss. Furthermore, this invention can measure the temperature pattern of a minute area or that at a deep bottom of a structure when the bottom is not visible directly from the exterior. Also, the resolving power can be increased to the limit of the light sensing part of the image pickup device. Moreover, the method and device of this invention have extremely high reliability in comparison with a conventional device of the non-contact type, and can accurately detect the temperature pattern of an object undergoing a great temperature change, e.g., electrically seamed pipes being welded on a production line. Hence, the present invention has great advantages and contributes greatly to advances in this kind of temperature measurement technique.

What is claimed is:

1. A temperature pattern measuring device for obtaining the surface temperature distribution of an object to be measured, comprising:
    a two-dimensional image pickup means;
    first and second optical filters provided along a light path extending from said object to said image pickup means, said filters arranged to select two different optical wavelength components of light from said object to be measured;
    an arithmetic means operatively connected to said image pickup means for determining the temperature on the surface of said object to be measured based on the ratio of the magnitude of said two different wavelength components of light,
    an additional image pickup means for obtaining a two-dimensional video image of said object to be measured;
    a combining means for combining outputs of said arithmetic means and said additional image pickup means and a monitor means operatively connected to said combining means, said arithmetic means controlling said image pickup means and said combining means such that a composite display comprising a two-dimensional video image of said object to be measured and a graphical representation of the temperature distribution pattern of said object to be measured is produced on said monitor.

2. A temperature pattern measuring device for obtaining the surface temperature distribution of an object to be measured, comprising:
    a two-dimensional image pickup means;

first and second optical filters provided along a light path extending from said object to said image pickup means, said filters arranged to select two different optical wavelength components of light from said object to be measured;

an arithmetic means operatively connected to said image pickup means for determining the temperature on the surface of said object to be measured based on the ratio of the magnitude of said two different wavelength components of light, said arithmetic means further determining the position on the surface of said object, wherein the temperature distribution pattern of the object to be measured is obtained;

an additional image pickup means for obtaining a two-dimensional video image of said object to be measured;

a combining means for combining outputs of said arithmetic means and said additional image pickup means and a monitor means operatively connected to said combining means, said arithmetic means controlling said image pickup means and said combining means such that a composite display comprising a two-dimensional video image of said object to be measured and a graphical representation of the temperature distribution pattern of said object to be measured is produced on said monitor.

3. A temperature pattern measuring device comprising:

a first two-dimensional image pickup means including a camera head and control unit;

an arithmetic means operatively connected to said first image pickup means;

a filter means including at least a first and a second optical filter movably arranged along a light path extending from an object whose temperature pattern is to be measured to said first image pickup means, said filter means operatively connected to and controlled by said arithmetic unit and said first and second optical filters arranged to select two different wavelength components of light;

said arithmetic means determining the temperature on the surface of said ojbect to be measured based on the ratio of the magnitude of said two different wavelength components of light, said arithmetic means further determining the position on the surface of said object, wherein the temperature distribution pattern of the object to be measured is obtained;

said arithmetic means controlling said filter means to alternately move said first and second optical filters along said light path;

a second two-dimensional image pickup means optically aimed at said object to be measured;

a picture composing unit operatively connected to said arithmetic unit and said second image pickup means;

a monitor means operatively connected to said picture composing unit;

wherein said arithmetic means controls said first image pickup means and said filter means and said picture composing unit such that said monitor displays a two-dimensional video image of said object to be measured and a graphical representation of the temperature distribution pattern thereof.

4. A temperature pattern measuring device comprising:

first and second image pickup devices, each comprising a camera head operatively connected to a control unit;

a third image pickup device;

first and second optical filters respectively provided along a light path extending from an object whose temperature pattern is to be measured to said first and second camera heads, said first and second optical filters arranged to respectively pass two different optical wavelength components of light to said first and second camera heads;

first and second integrator means respectively connected to said first and second contol units for integrating outputs thereof;

first and second analog-to-digital converter means respectively connected to said first and second integrator means for converting outputs thereof to digital signals;

an arithmetic means operatively connected to said first and second analog-to-digital converter means;

analog signal generating means for controlling said first and second control units;

a picture composing means operatively connected to said arithmetic means and said third image pickup device;

a monitor means operatively connected to said picture composing means;

said arithmetic means determining the temperature on the surface of said object to be measured based on the ratio of the magnitude of said two different wavelength components of light, wherein said arithmetic means controls said first and second control units and said picture composing means such that said monitor displays a two-dimensional video image of said object to be measured and a graphical representation of the temperature distribution pattern thereof.

5. A temperature pattern measuring device comprising:

first and second image pickup devices, each comprising a camera head operatively connected to a control unit;

a third image pickup device;

first and second optical filters respectively provided along a light path extending from an object whose temperature pattern is to be measured to said first and second camera heads, said first and second optical filters arranged to respectively pass two different optical wavelength components of light to said first and second camera heads;

first and second integrator means respectively connected to said first and second control units for integrating outputs thereof;

first and second analog-to-digital converter means respectively connected to said first and second integrator means for converting outputs thereof to digital signals;

an arithmetic means including a micro-computer operatively connected to said first and second analog-to-digital converter means;

storage means operatively connected to said micro-computer for storing digital data therein;

first and second digital-to-analog converter means operatively connected respectively between said micro-computer and said first and second control units for converting digital signals from said micro-computer to analog signals for controlling said first and second control units;

a picture composing means operatively connected to said micro-computer and said third image pickup device;

a monitor means operatively connected to said picture composing means;

wherein said first, second, and third image pickup devices are mechanically aimed at said object to be measured through at least one lens;

said arithmetic means determining the temperature on the surface of said object to be measured based on the ratio of the magnitude of said two different wavelength components of light, said arithmetic means further determining the position on the surface of said object, wherein the temperature distribution pattern of the object to be measured is obtained;

wherein said micro-computer controls said storage means and said first and second control units and said picture composing means such that said monitor displays a two-dimensional video image of said object to be measured and a graphical representation of the temperature distribution pattern thereof.

6. A temperature pattern measuring device in accordance with claims 1 or 2 or 3 or 4, or 5, wherein said object to be measured comprises a weld zone of an electrically seamed pipe being fabricated on an electrically seamed pipe manufacturing line;

further comprising means operatively connected to said arithmetic means for computing data for use in controlling said fabrication of said electrically seamed pipe from said measured temperature distribution pattern.

7. A temperature measuring device in accordance with claim 1 or 2, wherein said two-dimensional image pickup means comprises a random access scanning type image pickup system.

8. A temperature pattern measuring device in accordance with claim 3, wherein said first two-dimensional image pickup means comprises a random access scanning image pickup system.

9. A temperature pattern measuring device according to claim 4 or 5, wherein said first and second two-dimensional image pickup device each comprise a random access scanning type image pickup system.

10. A temperature pattern measuring device comprising:

First and second image pickup devices, each comprising a camera head operatively connected to a control unit;

first and second optical filters respectively provided along a light path extending from an object whose temperature pattern is to be measured to said first and second camera heads, said first and second optical filters arranged to respectively pass two different optical wavelength components of light to said first and second camera heads;

first and second integrator means respectively connected to said first and second control units for integrating the outputs thereof;

first and second analog-to-digital converter means respectively connected to said first and second integrator means for converting the outputs thereof to digital signals;

an arithmetic means operatively connected to said first and second analog-to-digital converter means;

analog signal generating means for controlling said first and second control units;

said arithmetic means determining the temperature on the surface of said object to be measure based on the ratio of the magnitude of said two different wavelength components of light.

11. A temperature pattern measuring device comprising:

first and second image pickup devices, each comprising a camera head operatively connected to a control unit;

first and second optical filters respectively provided along a light path extending from an object whose temperature pattern is to be measured to said first and second camera heads, said first and second optical filters arranged to respectively pass two different optical wavelength components of light to said first and second camera heads;

first and second integrator means respectively connected to said first and second control units for integrating the outputs thereof;

first and second analog-to-digital converter means respectively connected to said first and second integrator means for converting the outputs thereof to digital signals;

an arithmetic means including a micro-computer operatively connected to said first and second analog-to-digital converter means;

storage means operatively connected to said micro-computer for storing digital data therein;

first and second digital-to-analog converter means operatively connected respectively between said micro-computer and said first and second control units for converting digital signals from said micro-computer to analog signals for controlling said first and second control units;

a monitor means operatively connected to said micro-computer;

wherein said first and second image pickup devices are mechanically aimed at said object to be measured through at least one lens;

said arithmetic means determining the temperature on the surface of said object to be measured based on the ratio of the magnitude of said two different wavelength components of light, said arithmetic means further determining the position on the surface of said object, wherein the temperature distribution pattern of the object to be measured is obtained;

wherein said micro-computer controls said storage means and said first and second control units such that said monitor displays a graphical representation of the temperature distribution pattern of said object to be measured.

* * * * *